(12) United States Patent
Ewing

(10) Patent No.: US 8,898,739 B2
(45) Date of Patent: Nov. 25, 2014

(54) INTERCLUSTER RELATIONSHIP MANAGEMENT

(71) Applicant: NetApp Inc., Sunnyvale, CA (US)

(72) Inventor: Steven M. Ewing, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/087,886

(22) Filed: Nov. 22, 2013

(65) Prior Publication Data

US 2014/0082285 A1     Mar. 20, 2014

Related U.S. Application Data

(63) Continuation of application No. 12/416,699, filed on Apr. 1, 2009, now Pat. No. 8,621,569.

(51) Int. Cl.
*H04L 29/00*     (2006.01)
*H04L 29/08*     (2006.01)
*G06F 12/08*     (2006.01)

(52) U.S. Cl.
CPC .......... *G06F 12/084* (2013.01); *H04L 67/1097* (2013.01); *G06F 12/0866* (2013.01)
USPC ............... 726/3; 713/155; 713/156; 713/157; 713/158; 713/159; 726/4; 726/5

(58) Field of Classification Search
CPC ............................ H04L 63/08; Y02B 60/1246
USPC ......................................................... 726/3–5
See application file for complete search history.

(56) References Cited

U.S. PATENT DOCUMENTS 7,466,659 B1 *  12/2008  Kazar et al. .................. 370/252
2006/0004796 A1 *  1/2006  Nakamura ..................... 707/100

* cited by examiner

*Primary Examiner* — Ghazal Shehni
(74) *Attorney, Agent, or Firm* — Cooper Legal Group, LLC

(57) ABSTRACT

Data storage and management systems can be interconnected as clustered systems to distribute data and operational loading. Further, independent clustered storage systems can be associated to form peered clusters. As provided herein, methods and systems for creating and managing intercluster relationships between independent clustered storage systems, allowing the respective independent clustered storage systems to exchange data and distribute management operations between each other while mitigating administrator involvement. Cluster introduction information is provided on a network interface of one or more nodes in a cluster, and intercluster relationships are created between peer clusters. A relationship can be created by initiating contact with a peer using a logical interface, and respective peers retrieving the introduction information provided on the network interface. Respective peers have a role/profile associated with the provided introduction information, which is mapped to the peers, allowing pre-defined access to respective peers.

20 Claims, 10 Drawing Sheets

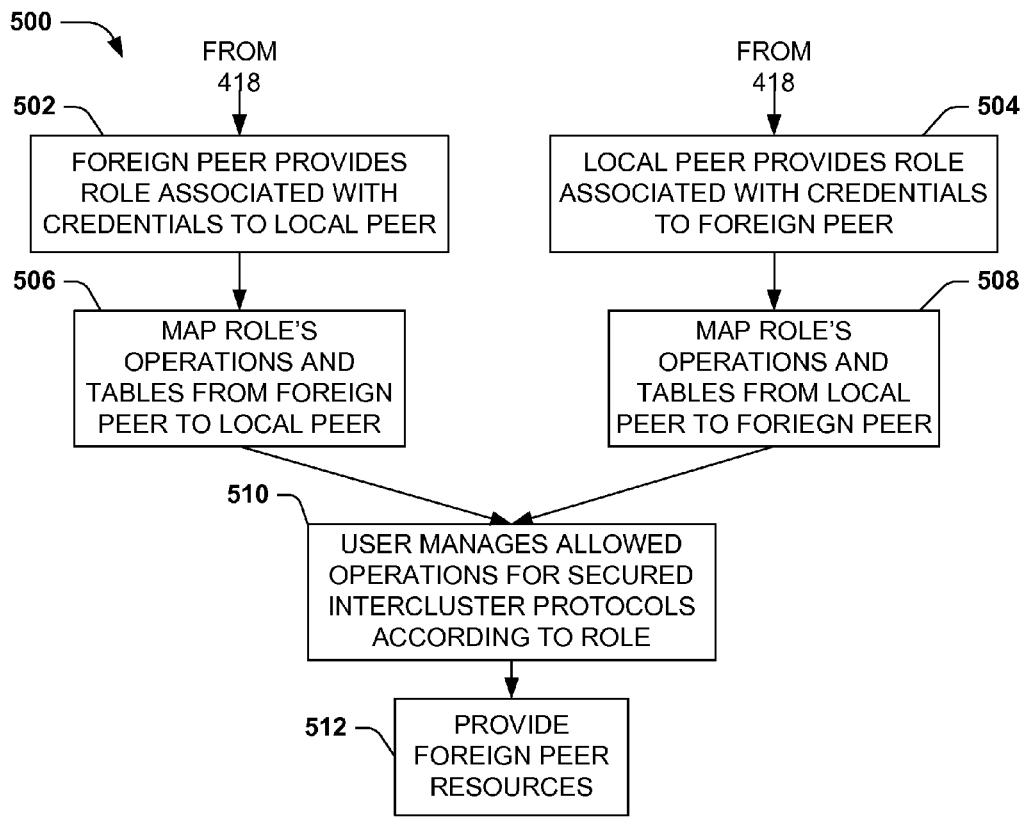

INTERCLUSTER RELATIONSHIP MANAGEMENT

RELATED APPLICATIONS

This application is a continuation of U.S. application Ser. No. 12/416,699, filed on Apr. 1, 2009, entitled "INTERCLUSTER RELATIONSHIP MANAGEMENT", at least some of which may be incorporated herein.

BACKGROUND

In a computing environment, a data storage and management system can provide access to information stored on one or a plurality of storage devices networked to the system. Storage devices may comprise disk drives, a plurality of which can be organized as disk arrays. Disks may describe a magnetic media storage unit, and may be synonymous with a hard disk drive, a direct access storage device, solid state drive, or other similar media used for persistent data storage. Data can be organized into volumes that are comprised on disk drives of one or more storage devices.

A plurality of storage system may be interconnected to provide a distributed storage system, for example, designed to mitigate problems with data access speed and availability. Such a clustered system distributes volumes serviced by a particular storage system to the plurality of storage systems in the cluster. This, in-turn, distributes data access requests among the storage systems in the cluster, thereby distributing a processing load that may accompany said requests.

Storage systems, including clustered storage systems, can be configured to accommodate a plurality of clients, in a client/server model, for data access and management. For example, a client may comprise an application running on a computer that connects to the storage system (or cluster) over a network. Clients can typically request services from the storage system by issuing packet-based, protocol requests to the system over the network. In-turn, the storage system may return requested data, or perform some data management request.

One may wish to link two or more independent cluster storage systems together, for example, providing a larger scale distributed storage system. Creating relationships between independent clusters can help alleviate some of the problems that are mitigated by creating a clustered storage system, such as specific data access and distributed operations for load balancing. However, associating independent clusters together can present logistical issues that are time consuming and difficult for a system administrator to handle.

Typically, if an administrator wishes to associate independent clusters, they must perform separate steps manually. For example, clusters are often manually authenticated by passing authentication back and forth between peer clusters; network addresses are sent between administrators of the peers, and are managed manually; and networking protocols need to be tunneled between the clusters, and the health of the peer systems must be manually monitored. Essentially, cross-cluster features typically need manual intervention by a cluster administrator.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Techniques and/or systems are disclosed herein for creating and managing intercluster relationships between independent clustered storage systems (e.g., independent from each other as standalone clustered storage systems), allowing the independent clustered storage systems to exchange data and distribute management operations between each other, for example, while mitigating a need for manual intervention by system administrators. In one embodiment, the techniques and systems comprise, among other things, having respective clustered storage systems (clusters), wishing to be peered (e.g., creating a communication link between the clusters), provide an intercluster relationship introduction service on a network interface. For example, the introduction service can present information that facilitates intercluster peering.

In this embodiment, a relationship can be created between a first clustered storage system and a second clustered storage system by having the first clustered storage system use a logical interface (e.g., on a local network interface) to initiate contact with the second clustered storage system that is providing an introduction service. Creating a relationship further comprises the second clustered storage system obtaining the introduction information from the first clustered storage system using the logical interface, and the second clustered storage system providing introduction information to the first clustered storage system using the logical interface. In this way, for example, respective clusters have information needed for creating an intercluster relationship. Additionally, a role that is associated with the introduction information provided by the introduction services of the respective clustered storage systems can be mapped from a foreign cluster (e.g., not local) to a local cluster. For example, the role defined by the introduction information can provide a pre-defined access profile to peer clusters.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 5 is a flow diagram illustrating exemplary portions of a method for creating and managing intercluster relationships between independent clustered storage systems.

FIG. 6 is an illustration of an example table for security protocol credentials.

DETAILED DESCRIPTION

Figure 1:
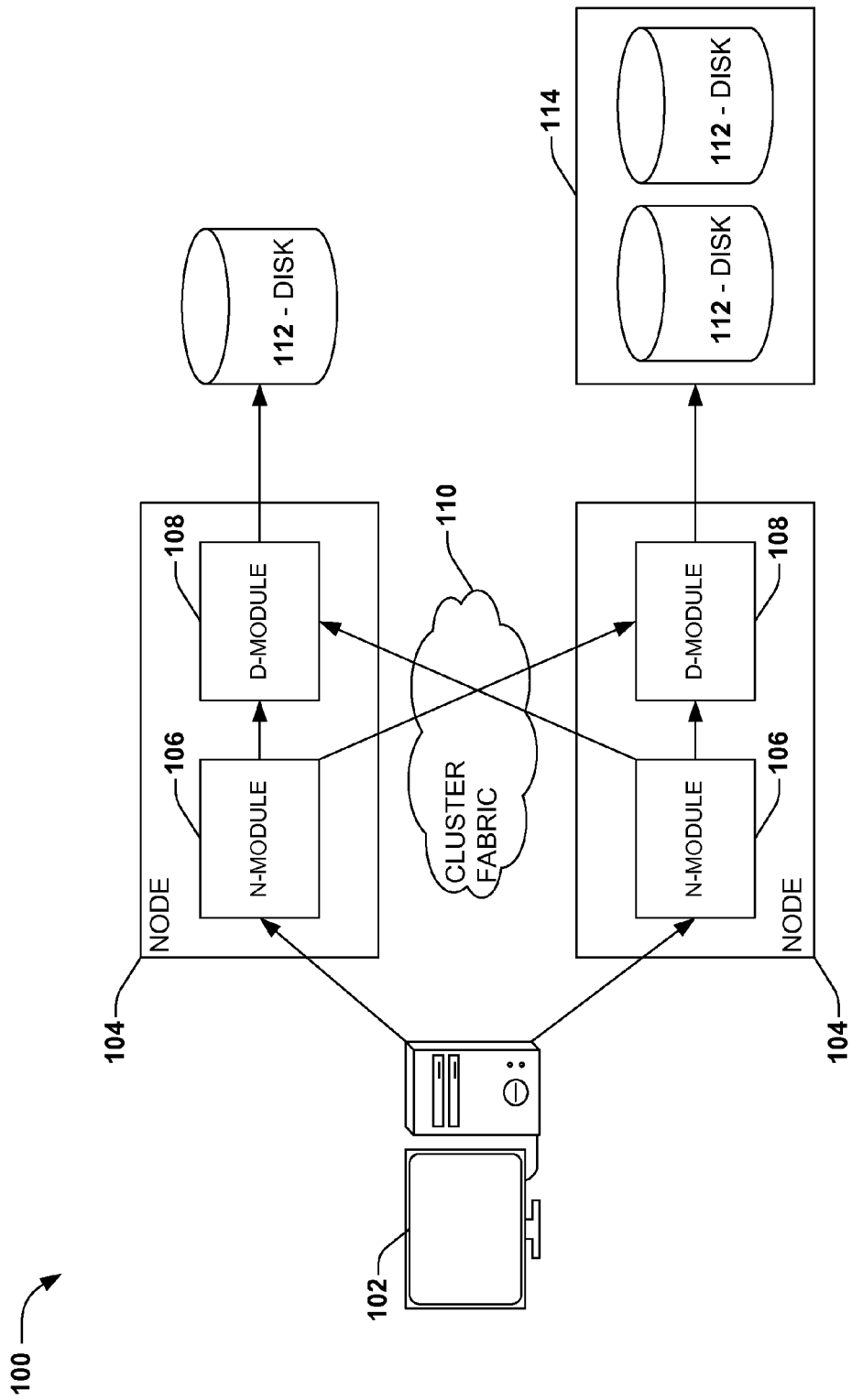
FIG. 1 is an illustration of an example embodiment of a clustered computing environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques and systems for creating and managing intercluster relationships between independent clustered storage systems, which may allow the respective independent clustered storage systems to exchange data and distribute management operations between each other. An independent clustered storage systems, for example, may comprise a clustered storage system that manages and operates its own data storage and management system as a standalone system separate from another independent clustered storage systems.

FIG. 1 is an illustration of an example embodiment 100 of a clustered computing environment, such as a data storage and management system. In this embodiment, nodes 104 are interconnected as a cluster to provide data storage and management services, such as to an enterprise, for example. A node in a data storage and management network cluster can be a device attached to the network as a connection point, redistribution point or communication endpoint. A node may be capable of sending, receiving, and/or forwarding information over a network communications channel, and could comprise any device that meets any or all of these criteria. One example of a node may be a data storage and management server attached to a network.

As illustrated in the exemplary embodiment 100, nodes 104 can comprise various functional components that coordinate to provide distributed storage architecture for the cluster. Nodes 104 can comprise a network module 106 (e.g., N-blade) and a disk module 108 (e.g., D-blade). Network modules 106 can be enabled to allow the node 104 to connect with clients 102, for example, allowing the clients 102 to access data stored in the distributed storage system. Disk modules 108 can be enabled to connect one or more storage devices, such as disks 112 or arrays of disks 114, to the node 104. The nodes 104 can be interconnected by a cluster switching fabric 110, for example, allowing respective nodes 104 in the cluster access to data on a disk 112 connected to a different node in the cluster.

It should be appreciated that, while the example embodiment 100 illustrates an equal number of N and D-modules, other embodiments may comprise a differing number of these modules. For example, there may be a plurality of N and/or D modules interconnected in a cluster that does not have a one-to-one correspondence between the N and D-modules. Further, a client 102 may be a general purpose computing device, such as a desktop personal computer, configured to network with a node 104 in the cluster. For example, clients 102 networked to a cluster may request services of a node 104 in the cluster, and the node 104 can return results of the requested services to the client 102.

Figure 2:
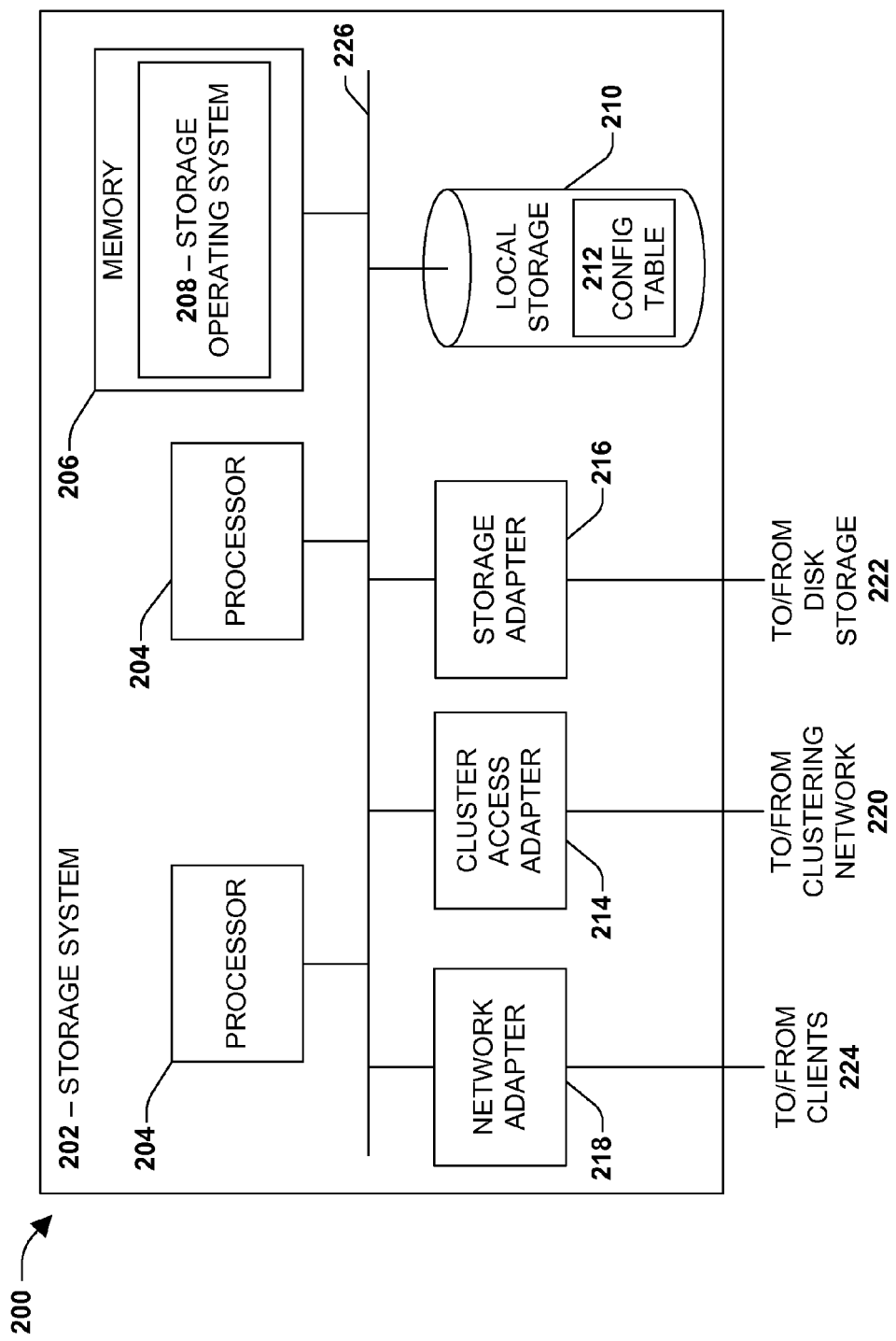
FIG. 2 is a block diagram of an example embodiment of an environment that may implement one or more of the techniques and/or systems, described herein.

FIG. 2 is a block diagram of an example embodiment of an environment 200, including a storage system 202, such as a node in a clustered storage system, that may implement one or more of the techniques and/or systems, described herein. The storage system 202 may be a computing device that provides access to files stored on mass storage devices, such as disk storage 222, for example, in a disk array. It will be appreciated that the techniques and systems, described herein, are not limited by the example embodiment. For example, disk storage 222 may comprise any type of mass storage devices, including but not limited to magnetic disk drives, flash memory, and any other similar media adapted to store information, including data and parity information.

The storage system 202 includes one or more processors 204, a memory 206, a network adapter 218, a storage adapter 216, and a cluster access adapter 214, interconnected by a system bus 226. The storage system 202 also includes a storage operating system 208 that can, for example, implement a Redundant Array of Independent (or Inexpensive) Disks (RAID) optimization system to optimize the reconstruction process of a failed disk in the disk storage 222.

In the example environment 200, memory 206 may include storage locations that are addressable by the processors 204 and adapters for storing related software program code and data structures. The processors 204 and adapters may, for example, include processing elements and/or logic circuitry configured to execute the software code and manipulate the data structures. The storage operating system 208, portions of which are typically resident in memory and executed by the processing elements, functionally organizes the storage system 202 by, inter alia and in one embodiment, invoking storage operations in support of a file service implemented by the storage system 202. It will be apparent to those skilled in the art that other processing and memory means, including various computer readable media, may be used for storing and executing program instructions pertaining to the inventive techniques described herein.

The network adapter 218 includes the mechanical, electrical and signaling circuitry needed to connect the storage system 202 to a client 224 (e.g., the client 102 in FIG. 1) over a computer network, which may comprise, among other things, a point-to-point connection or a shared medium, such as a local area network. The client 224 may be a general-purpose computing device, such as a desktop computer, configured to execute applications. Moreover, the client 224 may interact with the storage system 202 in accordance with a client/server model of information delivery. For example, the client may request the services of the storage system (e.g., acting as a server), and the storage system may return the results of the services requested by the client, by exchanging packets using protocol formats, such as a Common Internet File System (CIFS) protocol or a Network File System (NFS) protocol, over the network.

The storage adapter 216 cooperates with the storage operating system 208 executing on the storage system 202 to access information requested by the client 224. The information may be stored on any type of attached array of writeable media such as magnetic disk drives, flash memory, and any other similar media adapted to store information. In the example environment 200, in one embodiment, the information can be stored in disk blocks on the disks 222. The storage adapter 216 includes input/output (I/O) interface circuitry that couples to the disks over an I/O interconnect arrangement, such as a conventional high-performance, Fibre Channel serial link topology. The information is retrieved by the storage adapter 216 and, if necessary, processed by the processors 204 (or the adapter 216 itself) prior to being forwarded over the system bus 226 to the network adapter 218, where the information is formatted into a packet and returned to the client 224.

In one embodiment, storage of information on disk storage 222 can be implemented as one or more storage "volumes" that comprise a cluster of disks defining an overall logical arrangement of disk space. The disks 222, within a volume are typically organized as one or more groups of RAIDs.

In one embodiment, to facilitate access to disks 222, the storage operating system 208 may implement a file system (e.g., write anywhere file system) that logically organizes the information as a hierarchical structure of directories and files on the disks. In this embodiment, respective files may be implemented as a set of disk blocks configured to store information, such as data or parity, whereas the directory may be implemented as a specially formatted file in which other files and directories are stored. In the example environment 200, in one embodiment, the storage operating system 208 may be the NetApp® Data ONTAP® operating system (available from NetApp, Inc., Sunnyvale, Calif.) that implements a Write Anywhere File Layout (WAFL®) file system.

The cluster access adapter 214, in the storage system 202, may comprise a plurality of ports devised to couple the storage system 202 to other storage systems in a cluster of storage systems (e.g., as in the cluster of nodes in FIG. 1). In one embodiment, an Ethernet may be use as a clustering protocol and interconnect media for a clustering network 220. It will be apparent to those skilled in the art that other types of protocols and interconnects can be used for a clustering network 220, described herein. In an alternate embodiment, where an N-module and D-module may be disposed on separate storage systems or computers, the cluster access adapter 214 can be used by the N/D-module to communicate with the other N/D-modules of the cluster.

Further, although the storage system 202 is illustrated as a single unit in the exemplary environment 200, it can have a distributed architecture. For example, the storage system 202 can be implemented with multiple distributed storage servers. It can also include a physically separate network module (e.g., "N-module") and disk module (e.g., "D-module") (not shown), which communicate with other storage servers over an external interconnect. The N-module acts as a front-end of the storage system, exporting services to clients; and the D-module acts as the back-end, managing the underlying storage of the storage system. The N-module and D-module can be contained in separate housings and communicate with each other via network connections. Thus, the N-module and the D-module enable a storage server to be physically separated into multiple modules that can be distributed across a network.

Figure 3:
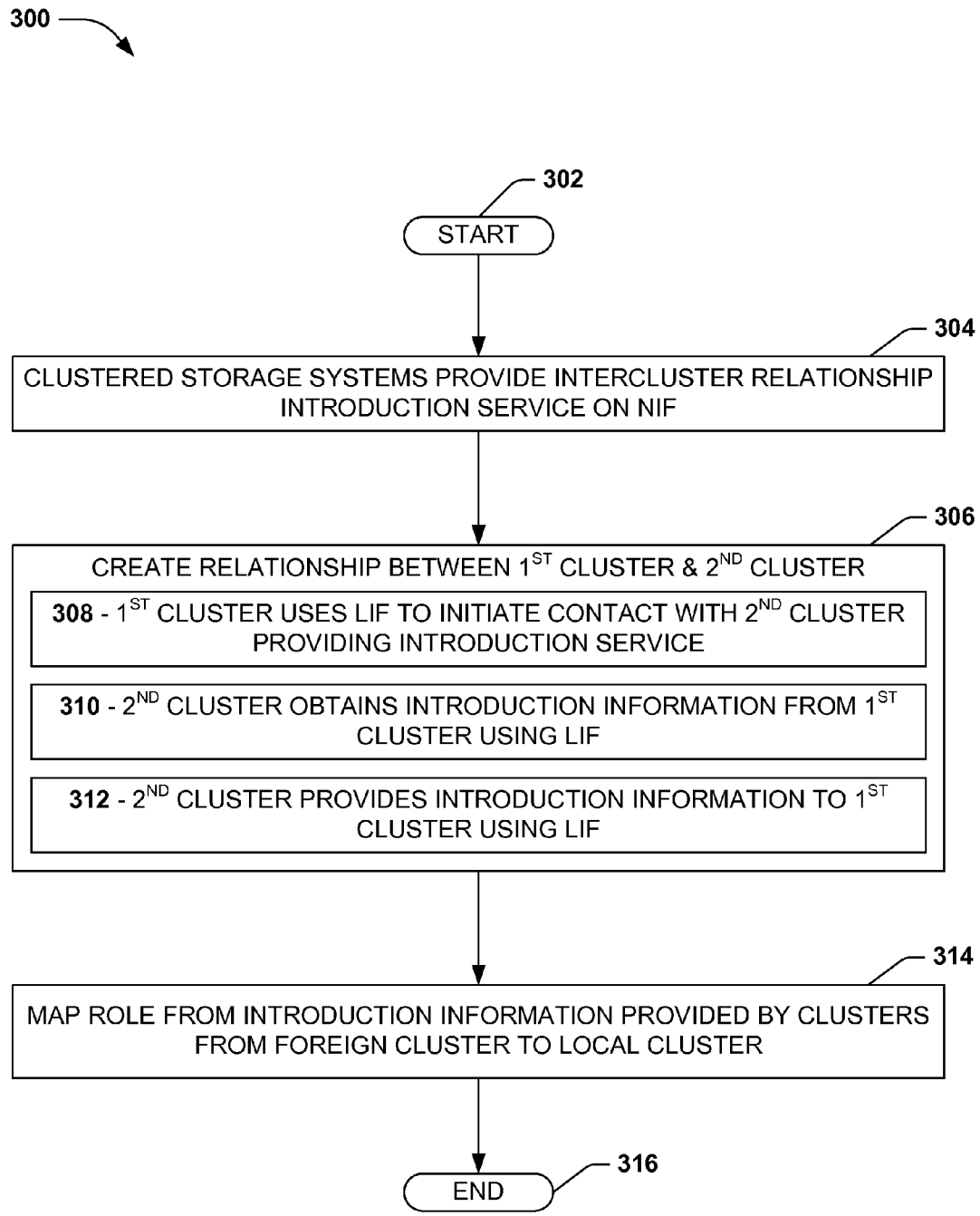
FIG. 3 is a flow diagram of an exemplary method for creating and managing intercluster relationships between independent clustered storage systems.

A method may be devised that allows clustered storage systems (clusters) to exchange data and distribute management operations between each other by creating intercluster relationships. FIG. 3 is a flow diagram of an exemplary method 300 for creating and managing intercluster relationships between independent clustered storage systems. The exemplary method 300 begins at 302 and involves clustered storage systems providing an intercluster relationship introduction service on a network interface, at 304. In one embodiment, an introduction service may comprise a service that provides information about an independent clustered storage system along with a set of credentials that one may use to access the cluster.

For example, information provided by the introduction service may comprise a serial number for the cluster, a universally unique identification (UUID), and/or a cluster name, which may provide some identification for the cluster. Further, in this example, the information may comprise a list of one or more stable Internet Protocol (IP) addresses that one may use to contact the cluster. The stable IP addresses may be used to contact the cluster associated with the address. The set of credentials provided by the introduction service, for example, may comprise a username and a password that allows a foreign cluster to access a cluster associated with the credentials.

At 306, in the exemplary method 300, a relationship is created between a first clustered storage system and a second clustered storage system. For example, an enterprise may have independent clustered storage systems located in two separate locations, and may wish to be able to create a communications link between the clusters in order to share data or distribute operations amongst the clusters.

In order to create a relationship, at 308, the first clustered storage system uses a logical interface (LIF) to initiate contact with the second clustered storage system that is providing an introduction service. In one embodiment, a LIF is an instantiation of an IP address and associated role defining configurations that allows a local cluster to communicate with a foreign cluster (e.g., not local). For example, the LIF can comprise a specific IP address for the local cluster, a network mask, and a plurality of network routing information; and the LIF can be assigned to a network interface (e.g., a network port) in a node in the local cluster. In this embodiment, the associated role configuration information may allow the cluster to limit networks on which inter-cluster traffic is placed.

In one embodiment, a user of the first cluster may be provided with an initial contact username and password that allows the LIF on the first cluster to initiate contact with the second cluster. For example, a system administrator may wish to join two independent clusters for an enterprise in order to distribute data load and data management operations. In this example, the system administrator may initiate contact with the foreign cluster using a username and password that allows the local cluster to open a communication link. In another embodiment, the relationship creation and initiation of contact may be automated, for example, upon some action occurring in the local cluster. In this example, relationship initiation may be programmed to automatically occur when a local system reaches a critical load point and desires to distribute a portion of that load to a second independent cluster.

At 310, creating a relationship between clusters further comprises the second clustered storage system obtaining the introduction information from the first clustered storage system using the LIF. It will be appreciated that this information may be obtained in one or more different manners. For example, the second clustered storage system may retrieve this information by reaching out to the first clustered storage system and acquiring or pulling in the same. Also, the first clustered storage system may provide or push this information to the second clustered storage system, which then consumes or otherwise uses the same. Additionally, a combination of pushing and pulling can be implemented so that the second clustered storage system ultimately obtains or ends up with the introduction information from the first clustered storage system. It will be appreciated that, unless specifically indicated otherwise, terms such as retrieve, obtain, acquire, etc. or variations thereof, are not meant to be interpreted in a strict sense. That is, they are not meant to be interpreted as absolute pushing or pulling, for example, but are instead meant to be interpreted more broadly to include pushing, pulling and/or a combination thereof, for example.

Additionally, at 312, the second clustered storage system provides introduction information to the first clustered storage system using the LIF. In one embodiment, after contact has been initiated between the first and second clusters, the second cluster can retrieve information provided by the first cluster's introduction service, and the second cluster can provide information to the first cluster from its introduction service. For example, after the local cluster contacts a foreign cluster over their intercluster LIF, it may obtain general information about the foreign cluster, as provided by the foreign cluster's introduction service. Likewise, the foreign cluster may retrieve information about the local cluster, as provided by the local cluster's introduction service, using their intercluster LIF. As an example, respective clusters may provide their serial number, UUID, name and a full set of appropriate IP addresses that can be used to contact it. In one embodiment, the stable address parameter may also support host names, in addition to the IP addresses. In this way, in this example, a communications relationship may be established between the local and foreign clusters, using their respective intercluster LIFs, on their respective network interfaces.

At 314, in the exemplary method 300, a role associated with the introduction information provided by the introduction service of the respective clustered storage systems is mapped from a foreign clustered storage system to a local clustered storage system. In one embodiment, a set of operation and configuration tables that are available to a foreign cluster in a local cluster can be controlled by a role assigned to the credentials provided for the foreign cluster. For example, the credentials provided by the local cluster's introduction service may be associated with a specific profile that has limited access to operations in the local cluster. In one embodiment, the role may be mapped to a specific role in the foreign clustered storage system and controlled by the same means that local roles may be controlled.

A profile from a foreign cluster can be mapped to a profile in the local cluster, and visa-versa, for example, thereby allowing respective clusters having an intercluster relationship to control how a foreign cluster interacts within the local cluster. In one embodiment, after activating a mapping procedure, if an authentication failure occurs an alert may be thrown that notifies an administrator that something is wrong in the foreign cluster credentials configuration. Having mapped the roles the exemplary method ends at 316.

Figure 4:
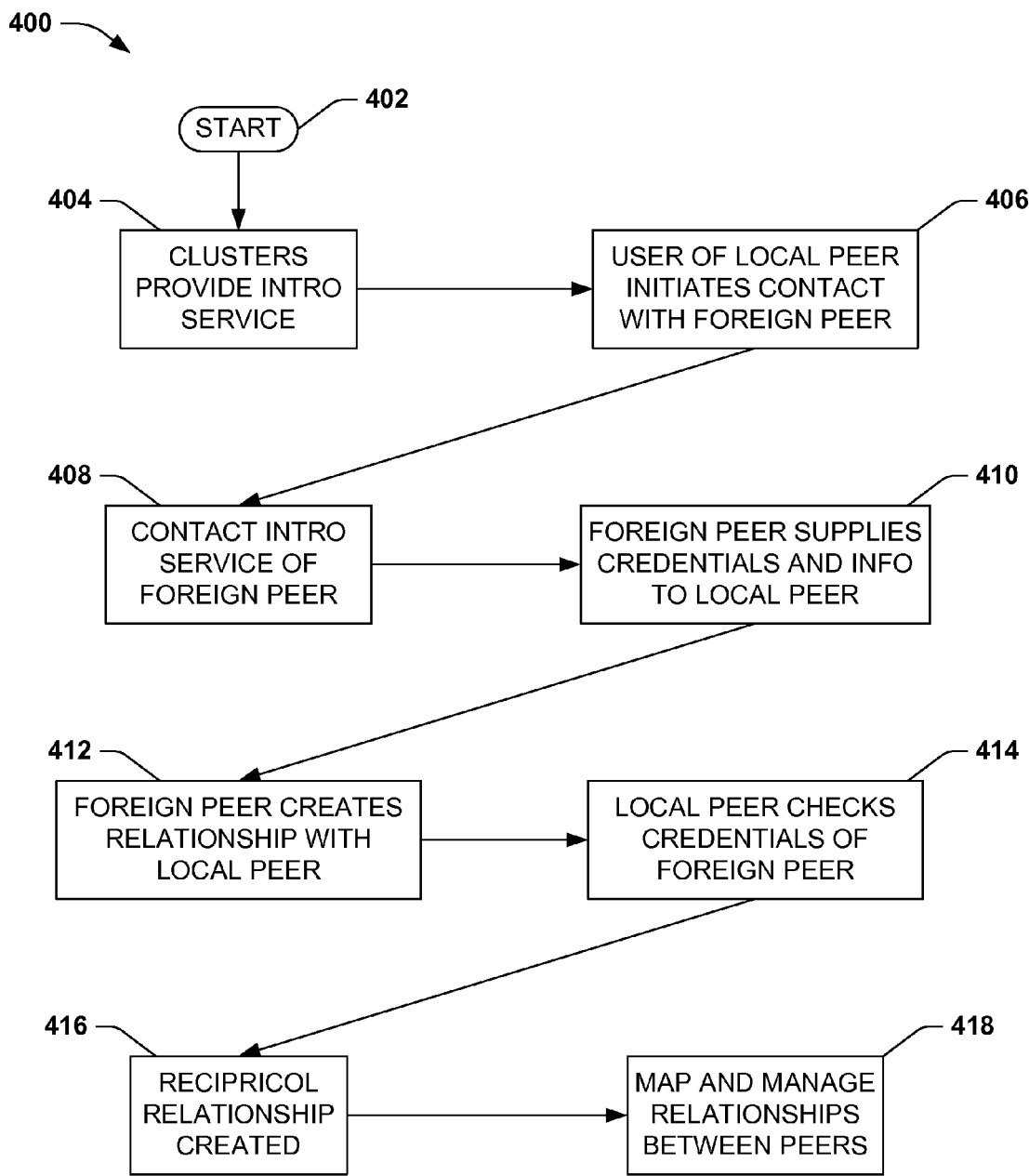
FIG. 4 is a flow diagram illustrating exemplary portions of a method for creating and managing intercluster relationships between independent clustered storage systems.

FIGS. 4-6 provide flow-diagrams illustrating an exemplary embodiment of a method for creating and managing intercluster relationships between independent clustered storage systems, including alternate embodiments than those described in FIG. 3, above. FIG. 4 is a flow diagram illustrating exemplary portions of a method 400 where a relationship is established between independent peer clusters. For example, an independent cluster may be one that is a standalone clustered storage system that is manages its own data storage operation within the cluster. Further, as an example, peer clusters can be those that have established a communications link between them (e.g., between a local and foreign cluster).

The exemplary method begins at 402 and involves the independent clusters providing an introduction service. For example, those independent clusters that wish to be able to create peer relationships (e.g., a communications link) with other independent clusters can provide the introduction service. In one embodiment, the introduction service comprises information about the cluster along with credentials that can be used by a foreign peer to access the cluster.

As described above, cluster introduction information may comprise a serial number, name, UUID, and a set of stable IP addresses that a foreign peer may use to communicate with the cluster. Further, credentials provided by the introduction service can comprise a username and password (or some other security access device) that allows a foreign peer to access the cluster in accordance with a role/profile set up for the particular username and password, for example. In one embodiment, the introduction information can be stored in the memory of a particular node (e.g., as in 206 of FIG. 2), and the introduction service can provide the information to foreign peers using a network interface that has been designated for intercluster communication.

At 406, a user of a local peer cluster (e.g., an administrator) can initiate contact with a foreign peer cluster. In one embodiment, a set of commands may be available that allow a user to connect the local cluster to a foreign cluster. For example, an administrator of cluster A may access a "cluster peer" command node, and enter a "create" command to initiate contact with a peer cluster, cluster B. In this example, the "create" command may be accompanied by a stable IP address for communicating with cluster B, along with an administrative initial contact username and password that allows access to the introduction service on cluster B. The IP address, username and password for initiating contact with cluster B can be supplied ahead of time in anticipation of peer clustering, for example.

In one embodiment, a logical interface (LIF) can be created in those clusters wishing to connect with other peer clusters, and the LIF can be designated with an intercluster role. As described above, the LIF can comprise an IP address used for communicating with the cluster, along with network configuration information that may provide some security for the intended network traffic. Further, in this embodiment, the initial contact username and password used to initiate a communication relationship will not typically be stored, as they are credentials for some administrative user in cluster B, for example, that has permission to run the "create cluster peer" command.

At 408, in FIG. 4, the local peer makes contact with the introduction service of the foreign peer. As an example, when the "create" command is run by the local peer, cluster A may contact cluster B over the LIF and make contact with cluster B's introduction service. At 410, the foreign peer cluster provides credentials and cluster information to the local peer, using the foreign peer's introduction service on a network interface. For example, cluster A can obtain general information about cluster B, such as its serial number, UUID, name, and a set of appropriate IP addresses (e.g., stable IP addresses) that can be used to contact it. Further, cluster A obtains a username and password (e.g., or some other form of credentials used to access the cluster) from cluster B, which is associated with a particular role on cluster B, for example.

At 412, the foreign peer cluster internally creates a communication relationship with the local peer cluster over the LIF. At 414, the local peer checks credentials supplied by the foreign peer, and creates a reciprocal relationship locally for the peer communications, at 416. Having created a communications relationship, using the LIFs, the exemplary portion of a method 400 begins to map and manage the communications relationship between the peered clusters (e.g., those clusters that have a communications relationship between them), at 418.

In one embodiment, the peer cluster relationship initiation process may be automated. In this embodiment, a particular situation on cluster A may automatically trigger the cluster to create a communications relationship with cluster B. In one example, data may be requested by a client accessing cluster A, however the data is not found on that cluster. In this example, cluster A may create a cluster relationship with cluster B to either look for the requested data or to retrieve the requested data. It will be appreciated that this may also occur manually, however. For example, respective users on the different clusters may manually execute commands similar to those used to initiate the automatic reciprocal version.

FIG. 5 is a flow diagram illustrating another exemplary portion of the method 500, where peer cluster roles can be mapped to their peers and the roles can be managed. At 502, the foreign cluster peer provides a role (e.g., a user profile) associated with the credentials, supplied by the foreign cluster's introduction service, to the local cluster peer. Further, at 504 the local cluster peer provides a role (e.g., a user profile) associated with the credentials, supplied by the local cluster's introduction service, to the foreign cluster peer.

For example, an administrator for cluster B may wish to limit the operations and configuration table information available to cluster A. In this example, the administrator for cluster B can create a profile associated with the credentials that merely allows peer clusters limited access to cluster B. Therefore, the operations and tables available to a peered cluster can be limited by the role associated with the credentials provided at the initiation of the peering relationship.

At 506, the operations and configuration table information, associated with the appropriate role, can be mapped from the foreign cluster to the local cluster peer. Further, at 508, the operations and configuration table information, associated with the appropriate role, can be mapped from the local cluster to the foreign cluster peer. In this way, for example, when a local cluster wishes to perform an operation or access information on a peer cluster the limitations will be available locally that identify whether the desired operations are available.

In this embodiment, 500, at 510, credentials can be managed within respective clustered storage systems according to their pre-determined role for respective secured intercluster protocols utilized, for example, by a cluster user (e.g., administrator). In one embodiment, a cluster peer table in respective peered clusters may identify which set of security mechanisms is enabled and what credential information can be used for particular secured intercluster protocols utilized, for both incoming and outgoing protocol packets. FIG. 6 is an illustration of an example table 600 that may be utilized for security protocol credentials.

The example table 600 illustrates security protocol credentials for a cluster named "b" 602. For a particular cluster 602, the example table 600 identifies a mechanism 608 used for respective security network protocols 604, for respective directions 606 (e.g., in-bound or out-bound packets), and an identity 610 used for the cluster.

In this embodiment, a row in the table describes a security mechanism associated with particular protocol in a particular direction. For example, one row identifies that the ZAPI protocol 604, for inbound packets 606, uses a password as the mechanism 608, and an identity 610 (e.g., UUID) that the peered cluster_b 602 is expected to use when contacting the local cluster with that mechanism. Further, in this example, for outbound ZAPI packets 606, the identity 610 is one used by the local cluster (e.g., cluster A) to contact the peered cluster_b when using the associated protocol. In this example, the table also identifies different roles for remote procedure call (RPC) protocols and for Spin network protocols (SpinNP).

In one embodiment, a user can create or change a mechanism for supported protocols, such as found in the exemplary table 600 of FIG. 6, at 608, by using a "create" command in a "cluster peer credentials" command node for the local cluster. In this embodiment, for example, the created or changed mechanism can be updated in the configuration table 600 of the cluster. However, respective secured network protocols will typically have pre-determined roles within a particular cluster, for example, as shown in FIG. 6. Further, in one embodiment, default values for identities 610 used can be automatically generated when the cluster are peered, for example, using a cluster's UUID with a randomly generated password. In this embodiment, a user/administrator may override these default values in the respective tables.

Figure 7:
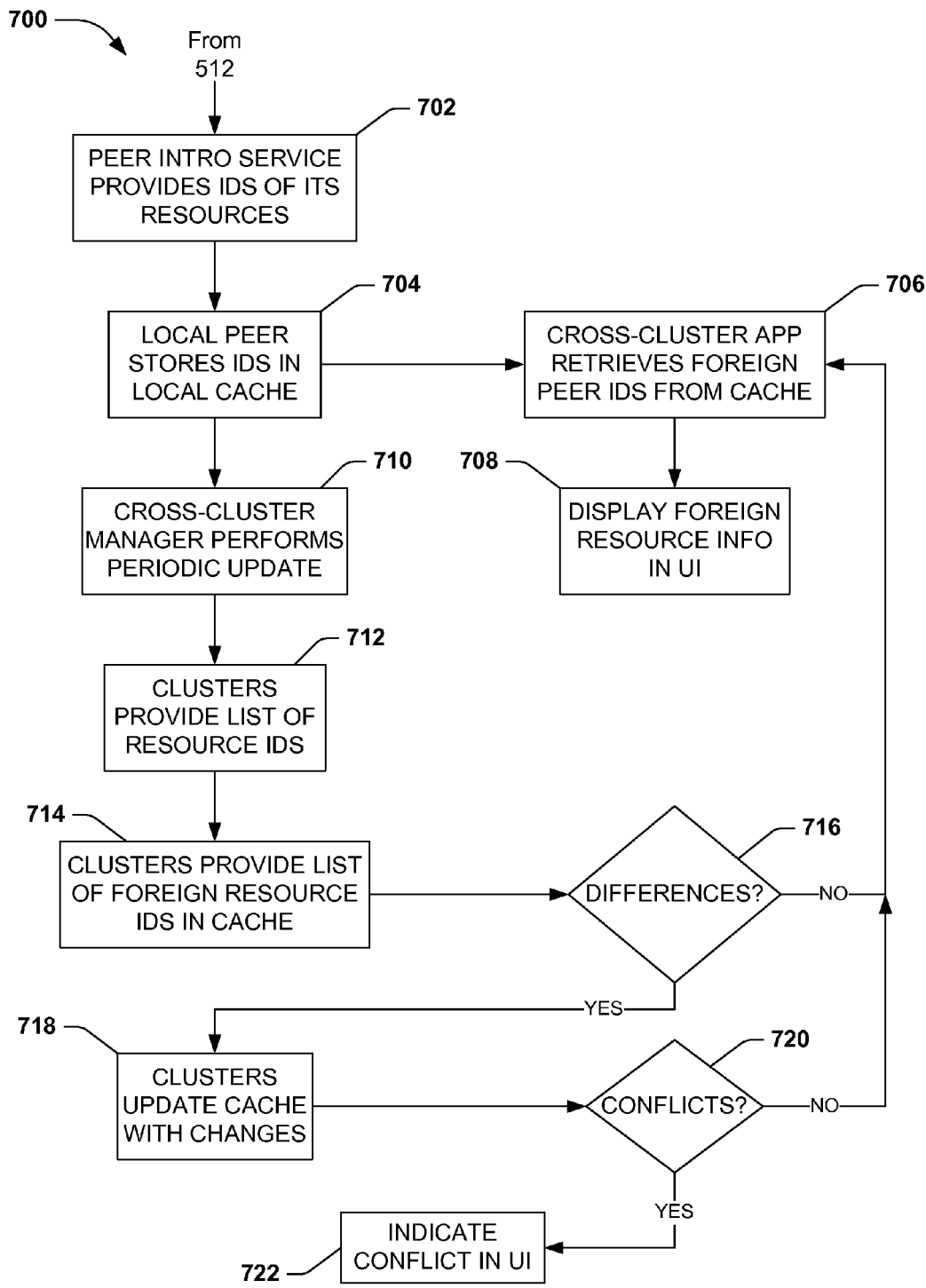
FIG. 7 is a flow diagram illustrating exemplary portions of a method for creating and managing intercluster relationships between independent clustered storage systems.

Turning back to FIG. 5, at 512, foreign peer resources can be provided to the local cluster peer. In FIG. 7, at 702, a cluster's introduction service provides a list of identifications for commonly utilized resources to a foreign peer, for example, at the initiation of the peering relationship (e.g., as described in FIG. 4). In one embodiment, when a local cluster wishes to display information about resources present in a foreign peer cluster, such as in a user interface (UI) utilized by a networked client, it would be desirable to have the appropriate information. For example, when a UI component references remote resources, such as peer volume names, the UI needs access to the resource identifications.

At 704, the local cluster peered with a foreign cluster stores the provided list of identifications for commonly utilized resources in a local cache, such as the local storage 210 from FIG. 2. It will be appreciated that a local cache may comprise any one or more of several data storage devices associated with the local cluster, such as RAM memory on a particular node, disk storage associated with a node, and disks in a disk array associated with the clustered storage system.

At 706, when a cross-cluster enabled application (e.g., one that is able to utilize resources from a peered cluster) running on a local cluster wishes to utilize information about a resource from a peered cluster, the application can retrieve the foreign peer identification information from the local cache. For example, if a client requests a list of volumes accessible to them, the local cluster can retrieve the foreign volume names from the local cache to be returned to the client. At 708, the foreign resource information can be displayed in a UI.

In an alternate embodiment, a foreign peer cluster may provide live access to their resource information from their configuration tables, to their peered clusters. For example, instead of retrieving peered cluster resource information from a local cache, the local cluster can retrieve the resource information, such as identifications, from the foreign cluster's tables. In this embodiment, the role associated with the credentials provided by the foreign cluster allows the local cluster to retrieve this information from the foreign cluster's configuration tables. Being able to retrieve live information may be useful if a conflict arises in the peer resource identities, for example. However, retrieving the information from a local cache will typically be faster than accessing a foreign peer's configuration tables.

At 710, a cross-cluster manager, which may be associated with respective nodes of a cluster involved with intercluster peering, performs a periodic update. For example, a periodic update may be used by intercluster peered nodes to determine health of an intercluster relationship and update information about peered clusters. At 712, as part of the periodic update, respective peered clusters provide a list of their resource identifications, for example, as was done when the peer relationship was created. The local cluster provides a comparable list of foreign cluster resources from their local cache, at 714, for respective peered clusters.

In this embodiment, if differences are identified by the intercluster manager, at 716, the local cache can be updated with respective identified changes at 718. In an alternate embodiment, a system administrator may manually check peered cluster resource identification information and manually update a local cluster cache with appropriate information. On the other hand, if no differences are identified at 716, the local cache can remain unchanged and cross-cluster applications can continue to retrieve foreign cluster resource information from the local cache, at 706.

In one embodiment, when peer clusters with which an intercluster relationship exists are renamed, it becomes possible that a naming conflict may arise. In this embodiment, a peer cluster can retain its name prior to renaming in respective cached information. At 720, if a conflict is identified, the conflict can be indicated in a UI, at 722, for example, so that an administrator can manually intervene. Otherwise, if no conflicts are identified, at 720, cross-cluster applications can continue to retrieve foreign cluster resource information from the local cache, at 706.

In one aspect, the infrastructure provided by peering independent clusters allows a first cluster to have access to a second cluster's transactional changes. For example, within a transactional domain of a cluster, updates may be made to one or many rows in one or many configuration tables in that cluster. In this aspect, these changes in a transactional domain can be requested locally or remotely, such as by a foreign peered cluster. In one embodiment, a replication service can be implemented that allows a local cluster to request transactional domain changes to configuration tables in a foreign peer cluster.

In another aspect, when communicating between peer clusters, it may be desirable to restrict an amount of network capacity that can be used for the communication with peer clusters. Further, it may be desirable to allow an administrator to decide which nodes, in a cluster, are able to communicate with a peer cluster. In one embodiment, a two-tiered set of network ports and LIF roles can be created that allow a user/administrator to restrict traffic based on their preferences.

For example, a physical network port in a node of a cluster can be assigned a role of intercluster network port, which dedicates its use to merely communicating between peer clusters. In this embodiment, ports that are assigned the intercluster network role may not be used for data access or local cluster access. An administrator may attach the port of a particular physical segment of the cluster, for example, for security purposes, or for network capacity allocation.

Further, in one embodiment, the administrator may assign an LIF an intercluster role on the dedicated intercluster network port, thereby separating it from a data LIF. For example, it is possible for an intercluster LIF to exist on both a data port and an intercluster port. In this embodiment, by assigning the LIF to an intercluster role, such as where specific routing rules may apply merely to intercluster traffic, an LIF on a data port can remain more secure than may be possible if it shared routing configuration with the intercluster LIF.

Further, in this aspect, one may limit which nodes in a clustered storage system can communicate with other peer clusters. In one embodiment, an administrator can restrict access to a network port assigned as the intercluster network port to merely those nodes allowed to communicate with other peer clusters. For example, where a cluster may comprise four nodes, merely two of the nodes may have dedicated intercluster network ports that allow them to communicate with peered clusters.

In another aspect, one reason for creating peering relationships between independent clusters may be to distribute intercluster network traffic between the peered clusters. However, this form of distributed resource allocation may be compromised if a communication address fails between peered clusters. In one embodiment, when a peering relationship is created between two independent clusters a set of stable IP address can be stored locally. When communicating between peered clusters, a local peer may contact respective foreign peers using the first stored IP address, for example. Further, if the first IP address fails to communicate when contacted by a peer, a second stored IP address can be used from the set of stored stable IP addresses. In this way, in this embodiment, the set of stored stable IP addresses provided during peering relationship creation can be utilized to mitigate cluster peering failure.

Figure 8:
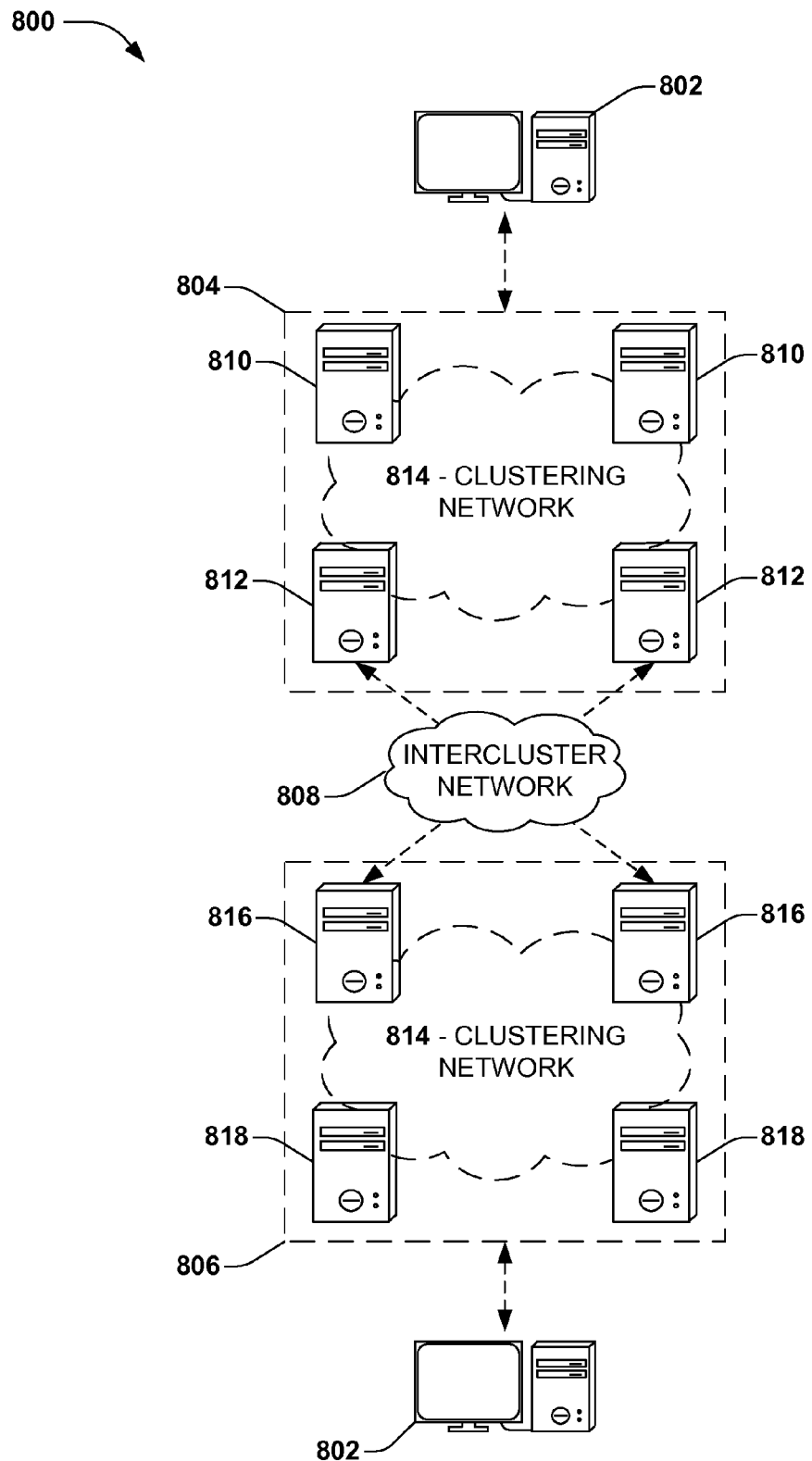
FIG. 8 is a component diagram illustrating an exemplary environment where methods and systems, described herein, may be implemented.

FIG. 8 is a component diagram illustrating an exemplary environment 800 where methods and systems, described herein, may be implemented. In the exemplary environment 800, a plurality of nodes 810 and 812, such as the data storage systems described in FIG. 1, 104 and FIG. 2, 202, comprise a first independent clustered storage system 804. Further, another plurality of nodes 816 and 818 comprise a second independent clustered storage system 806. Respective clusters 804 and 806 have their nodes clustered together by a clustering network 814, such as a networking fabric, in order to act as a distributed storage network, for example.

The exemplary environment comprises clients 802, such as those described in FIG. 1, 102, and in FIG. 2, 224, attached to the respective clusters 804 and 806. As described above, a client may be networked to a distributed data storage and management system, such as a cluster, in order to access and manage stored data (e.g., an enterprise system of clients networked to a storage system).

An intercluster network 808 is utilized by the respective clusters 804 and 806 to create and manage intercluster relationships, such as described above in FIGS. 3-7. In the exemplary environment 800, the nodes 812 in the first cluster 804 have an intercluster relationship with the nodes 816 in the second cluster 806. In this embodiment, for example, the nodes 812 and 816 have dedicated intercluster network interfaces that comprise instantiations of intercluster logical interfaces for creating and managing intercluster relationships with peer clusters 804 and 806.

Figure 9:
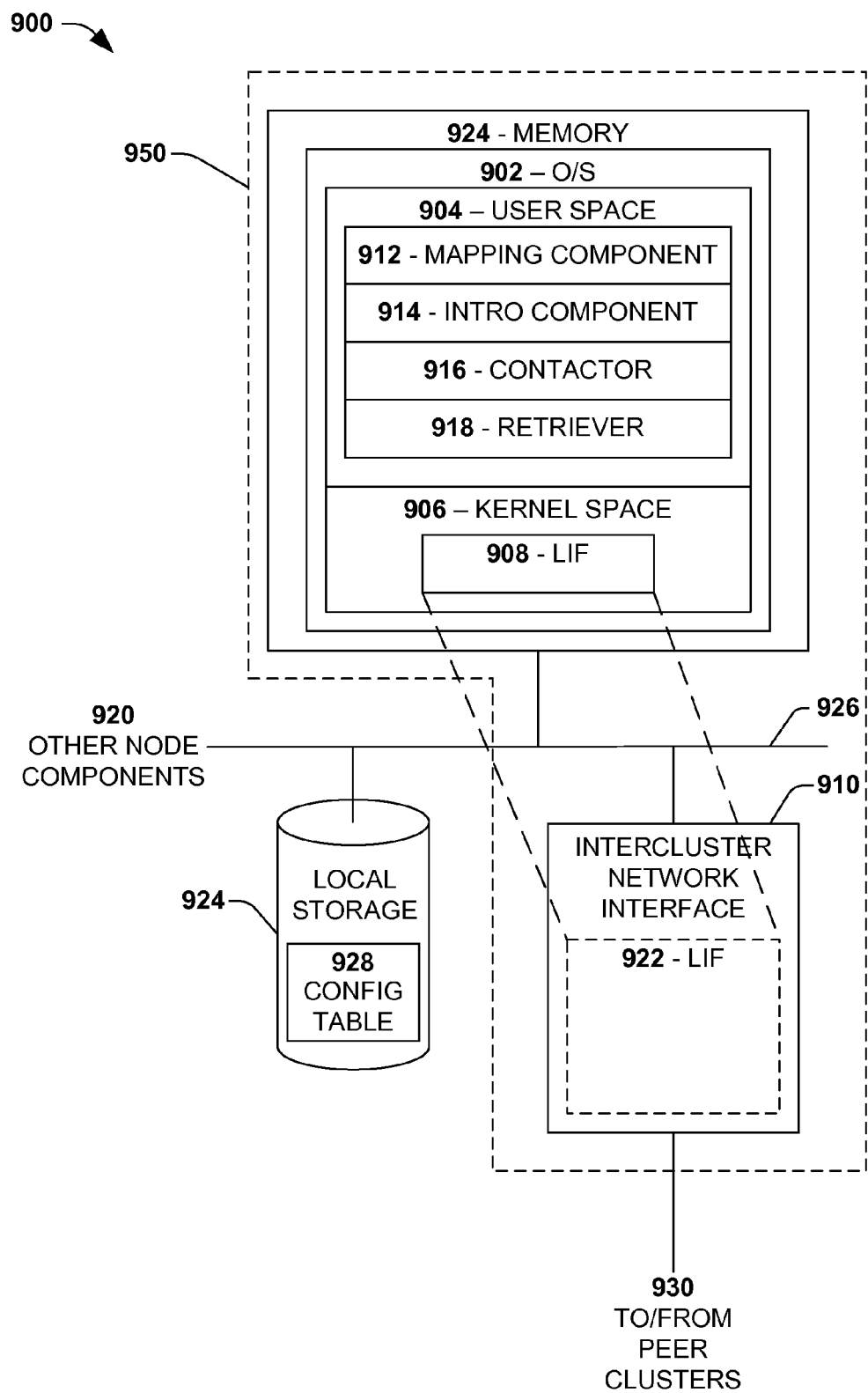
FIG. 9 is a diagram of an exemplary environment that implements an example system for creating and managing intercluster relationships between independent clustered storage systems.

A system may be devised that allows independent clustered storage systems to exchange data and distribute management operations between each other. FIG. 9 is a diagram of an exemplary environment 900 that implements an example system 950 for creating and managing intercluster relationships (peering) between independent clustered storage systems (clusters). In one embodiment, the example system 950 can be implemented in nodes (e.g., individual storage systems as in FIG. 2) of a clustered storage system, where intercluster relationships can be created and managed between respective nodes that implement the example system 950. In this embodiment, the example system 950 may merely comprise software components installed on respective nodes, along with dedicated intercluster network interfaces, for example.

In the exemplary environment 900, a node comprises a memory component 924, such as RAM or some other form of local quick access memory (e.g., as in FIG. 2, 206). The example node further comprises a local storage component, such as a local disk drive or some other form of data storage (e.g., as in FIG. 2 210), which comprises configuration tables 928 for the storage system. Additionally, an intercluster network interface 910 is linked to a bus line 926, which also links the components of the node in the exemplary environment 900, including other node components 920, such as those in FIGS. 2, 204 and 214-218.

An example system 950 for creating and managing peering between clusters comprises one or more intercluster network interfaces 910 that are operably coupled to a node (e.g., 812 & 816, in FIG. 8) in an independent clustered storage system (e.g., 804 & 806, in FIG. 8). The intercluster network interfaces 910 are configured to facilitate an intercluster communications link between peered clusters 930. In one embodiment, an administrator of an independent cluster can assign an intercluster communications role to a network interface on one or more nodes in the cluster. In this way, for example, the intercluster network interface 910 can be dedicated to the peering relationship with other independent clusters.

Further, in this embodiment, intercluster network interfaces can be disposed merely on desired nodes of the cluster. In this way, because merely those nodes having dedicated intercluster network interfaces 910 are able to be involved in the intercluster peering relationships, the system can be configured to limit intercluster communication to particular nodes, for example.

In the example system 950, an instantiation 922 of an intercluster logical interface 908 (LIF) is disposed on the intercluster network interface 910. The instantiation 922 of the LIF is configured to facilitate creating and managing a relationship between two or more independent clustered storage systems. In one embodiment, the LIF comprises an IP address used for intercluster communications, and configuration information, such as a network mask and a plurality of network routes. In this embodiment, the LIF 908 resides in kernel space 906 of an operating system 902 for the node/storage system. The LIF 908 can be instantiated 922 on the intercluster network interface 910, for example, and used for intercluster relationship creation and management.

The example system 950 further comprises an intercluster relationship introduction component 914 that is configured to present an instantiation of cluster introduction information on the one or more intercluster network interfaces 910. In one embodiment, the cluster introduction information can comprise identification information about the clustered storage system, and a set of credentials for accessing the clustered storage system. For example, identification information may include the cluster's serial number, UUID, name, and a set of IP addresses that can be used to contact the cluster. Further, as an example, the set of credentials can include a username and password that is associated with a specified role in the cluster, which may be used by a foreign cluster to access the local cluster.

In this embodiment, for example, the intercluster relationship introduction component 914 can make this information available on an intercluster network interface 910 for a foreign cluster wishing to peer with a local cluster. In this way, for example, when a foreign cluster contacts the local cluster using the intercluster network interface 910, the introduction information can be available for peering.

The example system 950 further comprises a peer cluster contact component 916 that is configured to initiate contact with a foreign clustered storage system using the LIF 908. In one embodiment, the peer cluster contact component 916 may be a software-based component residing in user space 904 of the operating system 902 for a node in a cluster. In this embodiment, for example, a user/administrator of the cluster may initiate the peer cluster contact component 916 by executing a command in a user interface (not pictured) in the operating system 902. In another embodiment, the peer cluster contact component 916 may be activated automatically upon a happening of some trigger event in the cluster (e.g., a data management overload that can be mitigated by distributing some operations to another cluster).

The example system 950 further comprises a peer information retrieval component 918 that is configured to retrieve introduction information from the intercluster relationship introduction component 914 of a foreign clustered storage system using the LIF 908. In one embodiment, the peer information retrieval component 918 may be a software-based component residing in the user space 904 of the operating system 902 for a node in a cluster. In this embodiment, after the peer cluster contact component 916 has made contact with a foreign cluster, the peer information retrieval component 918 can retrieve introduction information for the foreign peer. For example, the peer cluster contact component 916 may use an initial contact username and password that triggers the foreign cluster to release introduction information to the peer information retrieval component 918.

In another embodiment, if initial contact is made from a foreign cluster to the local cluster, the peer cluster contact component 916 in the local cluster may not be utilized. Instead, after the foreign cluster has contacted the local cluster, the local cluster's peer information retrieval component 918 can retrieve the introduction information from the foreign cluster. In this way, for example, a cross-cluster relationship can be established by either cluster, by retrieving the introduction information that allows the intercluster relationship to be created.

The exemplary system 950 further comprises a cluster role mapping component 912, which is configured to map a role associated with the introduction information provided by the introduction component 914 of a foreign cluster from the foreign clustered storage system to a local cluster. In one embodiment, the cluster role mapping component 912 may be a software-based component residing in the user space 904 of the operating system 902 for a node in a cluster. In this embodiment, after introduction information has been retrieved from a peer cluster, the cluster role mapping component 912 can map a role specified by the introduction information from the foreign peer cluster to the local cluster.

For example, where the cluster introduction information comprises credentials that allow the local cluster to access the foreign cluster, the cluster role mapping component 912 can use the credentials to retrieve the role associated with the credentials from the foreign cluster. In this example, the credentials may allow access to particular operations and configuration table 928 information, which can be mapped to the local cluster so that a local client can identify what is available locally on the foreign peer.

Figure 10:
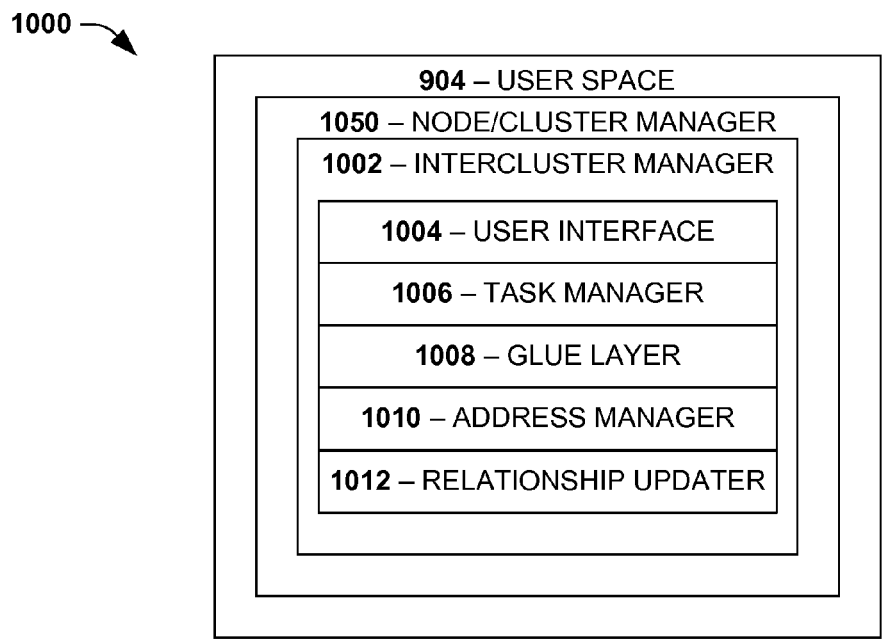
FIG. 10 is a diagram illustrating an exemplary embodiment of an intercluster management component, which may be implemented by the exemplary system in FIG. 9.

In another embodiment, an exemplary system for creating and managing peering between clusters can comprise an intercluster management component. The intercluster management component can be disposed on those nodes in a cluster that are enabled to communicate with a foreign cluster (e.g., intercluster peering). FIG. 10 is a diagram illustrating an exemplary embodiment 1000 of an intercluster management component 1002, which may be implemented by the exemplary system 950, in FIG. 9.

In this embodiment 1000, the intercluster management component 1002 is implemented as part of a cluster (or node) management component 1050 that may be utilized to manage operations and systems within a cluster (or node), for example. Further, the cluster (or node) management component 1050 can be a software-based component that resides in the user space 904 of an operating system for a node in the cluster.

In the exemplary embodiment 1000, the intercluster management component 1002 comprises an intercluster user interface (IUD 1004 that is configured to provide access to the intercluster management component for a user, such as an administrator of the cluster. For example, the IUI 1004 can be used to execute commands and retrieve information about the intercluster relationship. In one embodiment, the IUI 1004 may be incorporated into a UI for the cluster (or node) management component 1050.

The intercluster management component 1002 further comprises an intercluster task manager 1006 that is configured to manage intercluster related task requests for the local node. For example, if an intercluster enabled application requests information from a foreign peer, the intercluster task manager 1006 can generate a task queue that may be executed periodically or upon activation, for example. Further, in one embodiment the intercluster task manager 1006 can be configured to request configuration information from foreign clusters, and facilitate updating of foreign cluster resource information in a local cache. For example, the intercluster task manager 1006 can periodically execute and examine current stored configuration information and update needed, non-persistent configuration information received from foreign peers.

The intercluster management component 1002 further comprises an intercluster glue layer 1008 that is configured to perform intercluster related tasks. For example, the intercluster task manager 1006 can utilize the intercluster glue layer 1008 to complete tasks in a task queue. Further, intercluster enabled applications may utilize the intercluster glue layer 1008 to access peer clusters to retrieve appropriate information, such as resource identifications. In one embodiment, the intercluster glue layer 1008 may utilize management protocols to direct operations, which can be packaged and handed to secured network protocols (e.g., ZAPI, RPC, and SpinNP) for communicating with foreign peers through the LIF 908.

In another embodiment, the intercluster management component 1002 can comprise an intercluster relationship updater 1012, which is configured to provide a current list of node identifiers to foreign clusters, and update locally stored information received from foreign clusters. For example, the intercluster relationship updater 1012 can periodically query foreign peers for current node identification and resource information. In this example, the intercluster relationship updater 1012 may send current local information to foreign peers, which can trigger the peers to reciprocate with appropriate current information about themselves. This information can be used to update locally stored information about foreign peers, if it has changed, for example.

Figure 11:
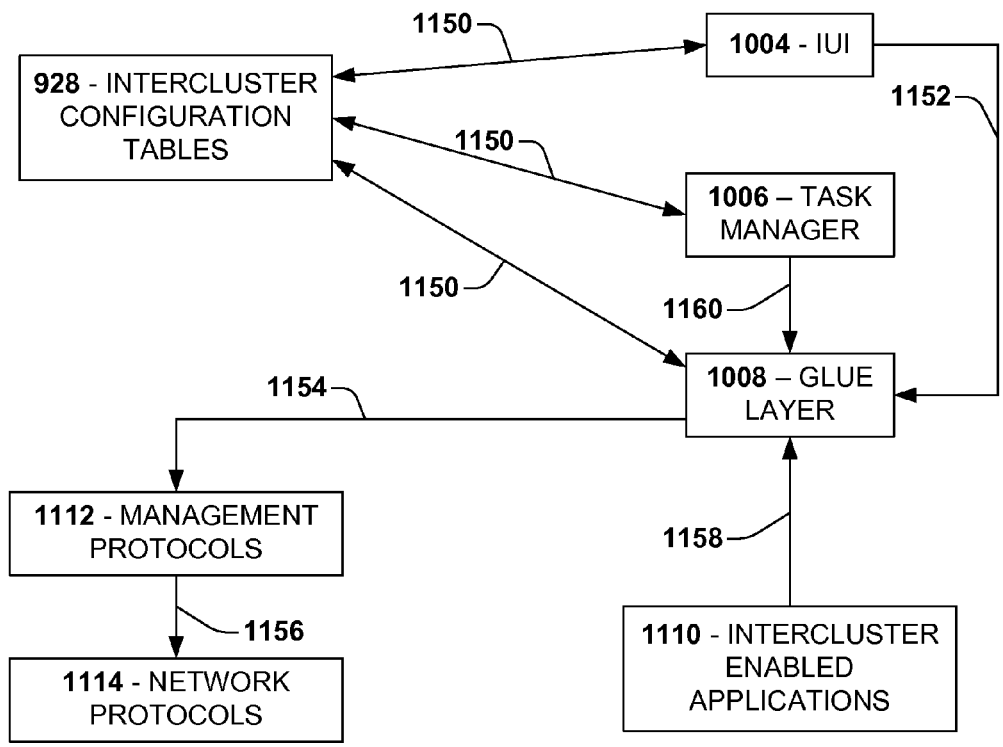
FIG. 11 is a component block diagram illustrating exemplary interactions between system components described herein.

FIG. 11 is a component block diagram illustrating exemplary interactions between system components described above. The intercluster user interface 1004 (IUI) may be utilized, for example, by an administrator or user to interact with 1150 (e.g., read and/or write to) the intercluster configuration tables 928 (e.g., stored in a nodes local storage 924, FIG. 9). Further, in this embodiment, a user of the IUI 1004 may request operations and access peer clusters 1152 through the intercluster glue layer 1008.

The intercluster task manager 1006 can also interact with 1150 (e.g., read and/or write to) the intercluster configuration tables 928, for example, to update a dynamic configuration of peer clusters. Further, the intercluster task manager 1006 can use the glue layer 1008 to complete tasks 1160, for example, from its task queue.

The intercluster glue layer 1008 may also interact with 1150 the intercluster configuration tables 928, for example, reading from the table when performing certain intercluster network operations. Further, the intercluster glue layer 1008 may use 1154 distributed management protocols 1112 to direct operations and data to peer clusters, for example. In this example, the operations can be packaged and handed to 1156 network protocols 1114, for communicating with the intercluster network.

Intercluster enabled applications 1110 can access peer clusters 1158 through the glue layer 1008. For example, where an intercluster enabled application 1110 needs a volume name or other peer resource information to execute for a user, the glue layer can be used to execute the request for information.

In another embodiment, a system for peering clusters can comprise a foreign cluster address management component. For example, where specified IP addresses are supplied by respective peers in the intercluster relationship, to be used for intercluster communication, the foreign cluster address management component can be used to manage these addresses.

Further, the address management component can be configured to store a set of stable IP address provided for a foreign cluster. For example, at the initiation of the peering relationship, a set of IP addresses can be supplied by the introduction component (FIG. 9, 914). Additionally, the address management component can be configured to contact peer clusters using stored stable IP addresses to collect active addresses for intercluster communication. For example, a list of IP addresses that are active for the peered cluster can be collected. Also, if an IP address for a peered cluster fails, the address management component can be configured to select another address from the stored list of IP address to continue communications with the foreign peer.

Figure 12:
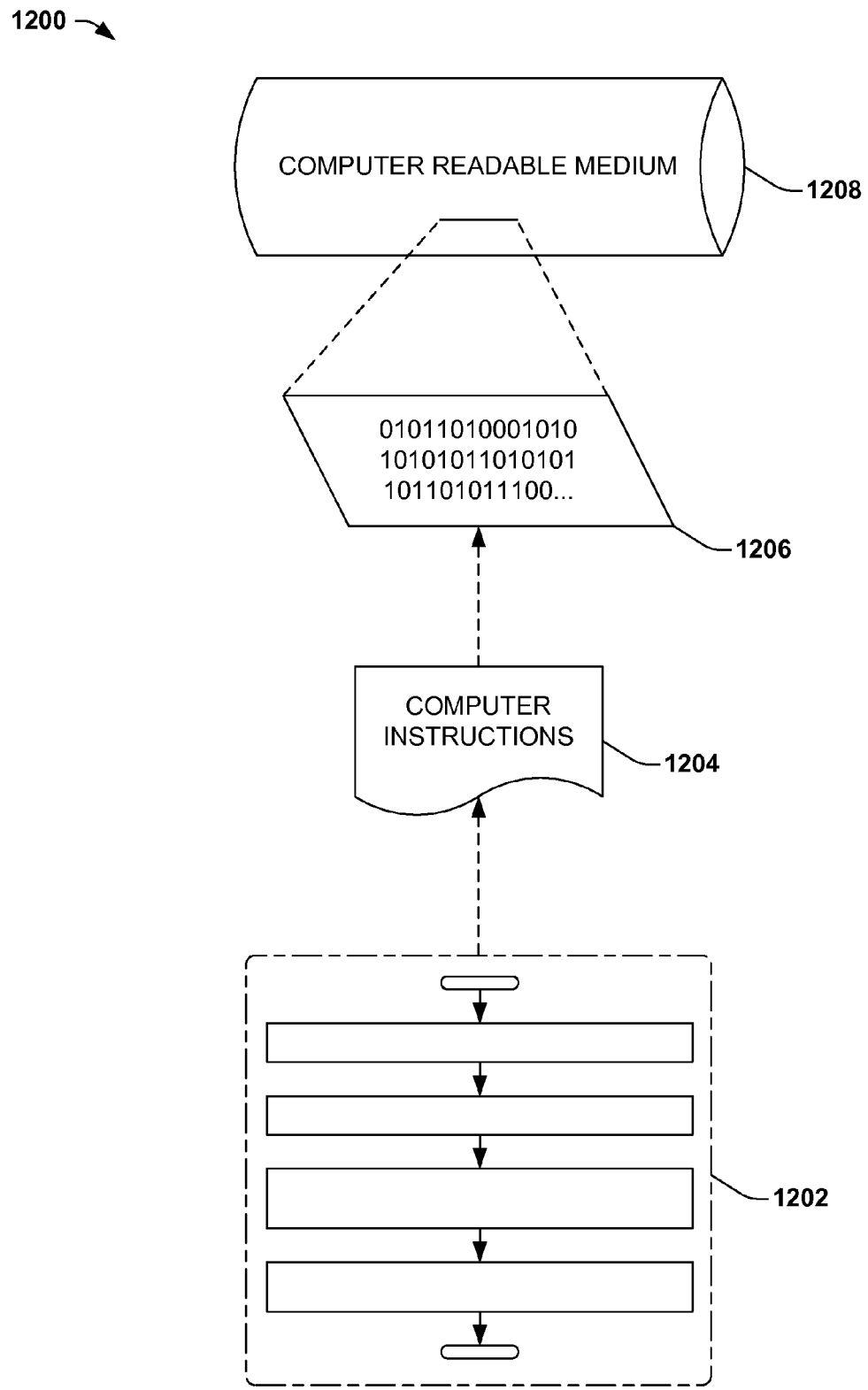
FIG. 12 is an illustration of an exemplary computer-useable medium comprising processor-executable instructions configured to embody one or more of the provisions set forth herein.

An exemplary computer-useable medium that may be devised in these ways is illustrated in FIG. 12, wherein the implementation 1200 comprises a computer-useable medium 1208 (e.g., a flash-drive, downloadable programming, CD-R, DVD-R, or a platter of a hard disk drive), on which is encoded computer-readable data 1206. This computer-readable data 1206 in turn comprises a set of computer instructions 1204 configured to operate according to one or more of the principles set forth above. In one such embodiment, the processor-executable instructions 1204 may be configured to perform the steps described in exemplary method 3, of FIG. 3.

In another such embodiment, the processor-executable instructions 1204 may be configured to implement a system, such as the exemplary system 950 of FIG. 9, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Computer useable media is intended to comprise any mechanism that can store data, which can be thereafter, be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or electronically addressed non-volatile memory, CD-ROMs, CD-Rs, CD-RWs, DVDs, cassettes, magnetic tape, magnetic disk storage, optical or non-optical data storage devices and/or any other medium which can be used to store data. Computer useable media may also comprise communication media, which typically embodies computer readable instructions or other data in a modulated data signal such as a carrier wave or other transport mechanism (e.g., that has one or more of its characteristics set or changed in such a manner as to encode information in the signal). The computer useable medium can also be distributed (e.g., using a switching fabric, such as used in computer farms) over a network-coupled computer system so that computer readable code is stored and executed in a distributed fashion.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for maintaining an intercluster relationship, comprising:

establishing an intercluster relationship between a first clustered storage system and a second clustered storage system, the first clustered storage system operating independent of the second clustered storage system;

responsive to the establishing, receiving at the first clustered storage system a list of identifications for one or more resources available at the second clustered storage system to be utilized by the first clustered storage system;

maintaining a local cache at the first clustered storage system, the local cache comprising the list of identifications;

responsive to identifying a request, at the first clustered storage system, to perform an operation, evaluating the local cache to determine whether the second clustered storage system provides the first clustered storage system with access to a resource corresponding to the operation based upon a review of the list of identifications; and responsive to the evaluating indicating that the second clustered storage system provides the first clustered storage system with access to the resource, implementing the operation using the resource via the intercluster relationship.

2. The method of claim 1, the request received from a cross-cluster enabled application hosted on the first clustered storage system.

3. The method of claim 1, comprising:

identifying a resource update from the second clustered storage system; and updating the local cache based upon the resource update.

4. The method of claim 1, comprising:
synchronizing the local cache with the second clustered storage system during a periodic update.

5. The method of claim 4, the periodic update comprising:
receiving a resource identification list from the second clustered storage system;
evaluating the list of identifications with the resource identification list; and
determining an update for the list of identifications based upon a difference between the list of identifications and the resource identification list.

6. The method of claim 1, at least some of the one or more resources comprising storage volumes.

7. The method of claim 1, the establishing an intercluster relationship comprising:
receiving, at the first clustered storage system and from an introduction service of the second clustered storage system, credentials to facilitate access to the second clustered storage system by the first clustered storage system.

8. The method of claim 1, comprising:
receiving a cache creation request from the second clustered storage system; and
providing the second clustered storage system with second resource information for inclusion within a second cache locally hosted by the second clustered storage system based upon the cache creation request.

9. The method of claim 8, comprising:
receiving a cache update request from the second clustered storage system regarding the second cache; and
providing cache update information to the second clustered storage system based upon the cache update request.

10. The method of claim 1, comprising:
responsive to the establishing, receiving at the first clustered storage system role information describing a set of operations available for invocation on the second clustered storage system by the first clustered storage system.

11. The method of claim 10, comprising maintaining the role information within the local cache.

12. The method of claim 11, the evaluating comprising evaluating the local cache to determine whether the operation is available for invocation on the second clustered storage system by the first clustered storage system based upon a review of the role information.

13. The method of claim 1, the resource comprising at least one of a data storage device accessible to the second clustered storage system, a RAM memory of a node within the second clustered storage system, disk storage associated with the node, or a disk array associated with the second clustered storage system.

14. The method of claim 1, comprising:
receiving a user specified update for the local cache; and
updating the local cache based upon the user specified update.

15. A system for maintaining an intercluster relationship, comprising:
memory; and
an intercluster relationship component operably coupled to the memory and configured to:
establish an intercluster relationship between a first clustered storage system and a second clustered storage system, the first clustered storage system operating independent of the second clustered storage system;
receive at the first clustered storage system a list of identifications for one or more resources available at the second clustered storage system to be utilized by the first clustered storage system responsive to establishing the intercluster relationship;
maintain a local cache at the first clustered storage system, the local cache comprising the list of identifications;
responsive to identifying a request, at the first clustered storage system, to perform an operation, evaluate the local cache to determine whether the second clustered storage system provides the first clustered storage system with access to a resource corresponding to the operation based upon a review of the list of identifications; and
responsive to the evaluating indicating that the second clustered storage system provides the first clustered storage system with access to the resource, implement the operation using the resource via the intercluster relationship.

16. The system of claim 15, the intercluster relationship component configured to:
implement the operation by providing a cross-cluster enabled application, hosted by the first clustered storage system, with access to the resource.

17. The system of claim 15, the intercluster relationship component configured to:
identify a resource update from the second clustered storage system; and
update the local cache based upon the resource update.

18. The system of claim 15, the intercluster relationship component configured to:
synchronize the local cache with the second clustered storage system during a periodic update.

19. The system of claim 15, the intercluster relationship component configured to:
receive a resource identification list from the second clustered storage system;
evaluate the list of identifications with the resource identification list; and
determine an update for the list of identifications based upon a difference between the list of identifications and the resource identification list.

20. A non-transitory computer-readable medium comprising processor-executable instructions that when executed perform a method for maintaining an intercluster relationship, comprising:
establishing an intercluster relationship between a first clustered storage system and a second clustered storage system, the first clustered storage system operating independent of the second clustered storage system;
responsive to the establishing, receiving at the first clustered storage system a list of identifications for one or more resources available at the second clustered storage system to be utilized by the first clustered storage system;
maintaining a local cache at the first clustered storage system, the local cache comprising the list of identifications;
responsive to identifying a request, at the first clustered storage system, to perform an operation evaluating the local cache to determine whether the second clustered storage system provides the first clustered storage system with access to a resource corresponding to the operation based upon a review of the list of identifications; and
responsive to the evaluating indicating that the second clustered storage system provides the first clustered storage system with access to the resource, implementing the operation using the resource via the intercluster relationship.

* * * * *